(12) United States Patent
Wiri et al.

(10) Patent No.: US 12,222,238 B2
(45) Date of Patent: Feb. 11, 2025

(54) BLAST TRIANGULATION

(71) Applicant: Applied Research Associates, Inc., Albuquerque, NM (US)

(72) Inventors: Suthee Wiri, Albuquerque, NM (US); Charles E. Needham, Albuquerque, NM (US); David J. Ortley, Albuquerque, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 135 days.

(21) Appl. No.: 17/826,631

(22) Filed: May 27, 2022

(65) Prior Publication Data

US 2023/0408325 A1    Dec. 21, 2023

(51) Int. Cl.
 *G01H 3/12* (2006.01)
 *G01S 5/20* (2006.01)

(52) U.S. Cl.
 CPC ........... *G01H 3/12* (2013.01); *G01S 5/20* (2013.01)

(58) Field of Classification Search
 CPC .................................. G01H 3/12; G01S 5/20
 USPC ....................................................... 367/124
 See application file for complete search history.

(56) References Cited

U.S. PATENT DOCUMENTS

| | | | |
|---|---|---|---|
| 6,178,141 | B1 | 1/2001 | Duckworth et al. |
| 11,543,316 | B2 | 1/2023 | Wiri et al. |
| 12,000,747 | B2 | 6/2024 | Willens et al. |
| 2002/0003470 | A1 | 1/2002 | Auerbach |
| 2010/0005571 | A1 | 1/2010 | Moss et al. |
| 2012/0170412 | A1 | 7/2012 | Calhoun et al. |
| 2015/0051847 | A1 | 2/2015 | Angello et al. |
| 2015/0143875 | A1 | 5/2015 | Wong et al. |
| 2016/0267763 | A1 | 9/2016 | Allen et al. |
| 2017/0196497 | A1 | 7/2017 | Ray et al. |
| 2017/0367627 | A1 | 12/2017 | Brister et al. |
| 2022/0214124 | A1 | 7/2022 | Leonhardt et al. |
| 2022/0317145 | A1 | 10/2022 | Bartsch |
| 2023/0080071 | A1 | 3/2023 | Allen et al. |
| 2023/0144611 | A1 | 5/2023 | Wiri et al. |
| 2023/0408325 | A1 | 12/2023 | Wiri et al. |

FOREIGN PATENT DOCUMENTS

| | | |
|---|---|---|
| CN | 111024011 A | 4/2020 |
| JP | 20200064883 | 4/2020 |
| KR | 1020110040648 A | 4/2011 |

(Continued)

OTHER PUBLICATIONS

Raytheon Intelligence & Space; Boomerang Gunshot Detection: Locate The Enemy—Coordinate The Response; pp. 1-4; https://prd-sc101-cdn.rtx.com/-/media/ris/what-we-do/modernization-mission-support/mission-support/boomerang/2020-10/files/boomerang_data.pdf?rev=b3b7837160db47cca32e50a01a7d175b; retrieved on Aug. 26, 2022.

(Continued)

*Primary Examiner* — Daniel L Murphy
(74) *Attorney, Agent, or Firm* — Erise IP, P.A.

(57) ABSTRACT

A method, system, and computer-readable media for collecting blast exposure data relating to a blast exposure event from one or more blast sensors and performing a blast exposure analysis that results in identifying the source of the blast exposure event using the blast exposure data. The one or more blast sensors may be communicatively coupled to at least one user device. Such a blast exposure analysis is provided in response to the blast exposure event such that operators may be notified of the blast exposure in real-time.

20 Claims, 9 Drawing Sheets

(56) References Cited

FOREIGN PATENT DOCUMENTS

| WO | 2017011811 A1 | 1/2017 |
| WO | 2018093444 A1 | 5/2018 |

OTHER PUBLICATIONS

Shotspotter; Reduce Gun Crime with Proven Gunshot Detection Technology; pp. 1-7; https://www.shotspotter.com/law-enforcement/gunshot-detection-technology/; retrieved on Aug. 26, 2022.

PCT Patent Application PCT/US2023/023380 International Search Report and Written Opinion of the International Searching Authority issued Sep. 7, 2023.

PCT Patent Application PCT/US2021/058000 International Preliminary Report on Patentability issued May 8, 2023.

PCT Patent Application PCT/US2023/014258 International Search Report and Written Opinion of the International Searching Authority issued Jun. 19, 2023.

U.S. Appl. No. 18/149,124 Non-Final Office Action issued Mar. 19, 2024.

U.S. Appl. No. 18/317,669 Non-Final Office Action issued Mar. 21, 2024.

PCT Patent Application PCT/US2024/27228 International Search Report and Written Opinion of the International Searching Authority issued Aug. 20, 2024.

European Patent Application 21890036.3, Extended Search Report, issued Sep. 9, 2024.

Peter Prince et al: "Deploying Acoustic Detection Algorithms on LowCost, Open-Source Acoustic Sensors for Environmental Monitoring", Sensors, vol. 19, No. 3, Jan. 29, 2019 (Jan. 29, 2019), p. 553, XP055685440, DOI: 10.3390/s19030553.

U.S. Appl. No. 18/149,124 Notice of Allowance issued Aug. 28, 2024.

U.S. Appl. No. 18/317,669 Notice of Allowance issued Aug. 28, 2024.

U.S. Appl. No. 18/149,124 Notice of Allowance issued Aug. 6, 2024.

U.S. Appl. No. 18/317,669 Notice of Allowance issued Aug. 7, 2024.

BLAST TRIANGULATION

RELATED APPLICATIONS

This patent application shares certain subject matter in common with earlier-filed U.S. patent application Ser. No. 17/093,107 filed Nov. 9, 2020, and entitled IDENTIFYING FALSE POSITIVE DATA WITHIN A SET OF BLAST EXPOSURE DATA. This patent application shares certain subject matter in common with earlier-filed U.S. patent application Ser. No. 17/683,808 filed Mar. 1, 2022, and entitled BLAST EXPOSURE ASSESSMENT SYSTEM. The above-referenced patent applications are hereby incorporated by reference in their entirety into the present application.

BACKGROUND

1. Field

Embodiments of the invention relate to blast exposure analysis. More specifically, embodiments of the invention relate to triangulating blast exposure data received from one or more blast sensors.

2. Related Art

In some circumstances, blast exposure data has been used to monitor the health of one or more operators in the vicinity of an explosive blast. However, the blast exposure data is typically analyzed at a later time, for example, using a blast exposure report that is presented well after the blast exposure occurred. Accordingly, there is no way to provide useful information to the one or more operators at the time of the blast based on a real-time analysis of the blast exposure data.

Further still, audio-based systems have been provided for identifying the source of an audible weapon system using an array of microphones. However, these systems fail to provide a blast exposure analysis using one or more blast sensors. Additionally, said audio-based systems rely on audio data from one or more pre-positioned microphones with fixed and known positions, and which also detect large amounts of background noise that does not correlate to a blast exposure. Accordingly, it becomes difficult to distinguish useful blast-related data from the spurious data captured by the one or more microphones.

SUMMARY

Embodiments of the invention solve the above-mentioned problems by providing a method, system, and computer-readable media for identifying the source of a blast exposure using blast exposure data collected from one or more blast sensors and, in some embodiments, at least one user device communicatively coupled to the one or more blast sensors. In some embodiments, a blast exposure analysis is provided in response to a blast exposure event such that operators may be notified of a blast exposure in real-time.

In some aspects, the techniques described herein relate to a method for identifying and triangulating blast exposure data, the method including receiving, from each of a plurality of blast sensors, blast exposure data corresponding to a blast exposure, receiving location data associated with the plurality of blast sensors, triangulating the blast exposure data from two or more of the plurality of blast sensors and the location data to locate a source of the blast exposure, estimating a yield of the blast exposure from the blast exposure data, identifying a blast signature of the blast exposure based on the estimated yield from the blast exposure data, comparing the identified blast signature with one or more predefined blast signature profiles, identifying the source of the blast exposure based on the comparison of the identified blast signature, and notifying one or more operators of the blast exposure.

In some aspects, the techniques described herein relate to a method, further including determining a velocity of an incoming projectile associated with the blast exposure, and notifying one or more operators of a direction associated with a velocity of the projectile.

In some aspects, the techniques described herein relate to a method, further including selecting a blast source type icon for display within a user interface based on the identified source of the blast exposure.

In some aspects, the techniques described herein relate to a method, wherein the location data is received from a GPS receiver associated with a mobile user device.

In some aspects, the techniques described herein relate to a method, further including receiving audio data from one or more microphones of a user device, wherein the blast signature is identified based further on the audio data.

In some aspects, the techniques described herein relate to a method, further including receiving one or more predefined blast exposure signatures, and registering one or more known blast sources associated with the one or more predefined blast exposure signatures.

In some aspects, the techniques described herein relate to a method, further including determining that the blast exposure is associated with a friendly blast source based on the blast signature of the blast exposure, and determining that a subsequent blast exposure is associated with an enemy blast source based on a blast signature of the subsequent blast exposure.

In some aspects, the techniques described herein relate to a system for identifying and triangulating blast exposure data, the system including one or more blast sensors, a user device communicatively coupled to the one or more blast sensors, the user device including one or more microphones, one or more location sensors, at least one processor, and at least one non-transitory memory storing computer executable instructions that when executed by the at least one processor, perform a method for identifying and triangulating blast exposure data, the method including receiving, from the one or more blast sensors, blast exposure data corresponding to a blast exposure, receiving audio data from the one or more microphones, receiving location data from the one or more location sensors, triangulating the blast exposure data from the one or more blast sensors and the location data to locate a source of the blast exposure based at least in part on additional blast exposure data and additional location data from another user device, identifying a blast signature of the blast exposure based on the blast exposure data from the one or more blast sensors and the audio data from the one or more microphones, comparing the identified blast signature with one or more predefined blast signature profiles, and identifying the source of the blast exposure based on the comparison of the identified blast signature.

In some aspects, the techniques described herein relate to a system, the method further including estimating a yield of the blast exposure from the blast exposure data, wherein the blast signature is identified based further on the estimated yield.

In some aspects, the techniques described herein relate to a system, wherein the user device further includes a display, and one or more speakers, and wherein the method further includes notifying one or more operators of the blast exposure via the display and the one or more speakers of the user device.

In some aspects, the techniques described herein relate to a system, the method further including causing display of a weapon identifier icon on the display of the user device, wherein the weapon identifier icon is selected based on the identified source of the blast exposure.

In some aspects, the techniques described herein relate to a system, the method further including causing display of one or more ally indicator icons based on respective locations of one or more ally users.

In some aspects, the techniques described herein relate to a system, wherein the one or more blast sensors includes at least one body-mounted blast sensor secured to an operator.

In some aspects, the techniques described herein relate to a system, the method further including storing blast exposure data from the at least one body-mounted blast sensor, and monitoring a health of the operator based on blast exposure data from the at least one body-mounted blast sensor.

In some aspects, the techniques described herein relate to one or more non-transitory computer-readable media storing computer-executable instructions that, when executed by at least one processor, perform a method for identifying and triangulating blast exposure data, the method including receiving, from each of a plurality of blast sensors, blast exposure data corresponding to a blast exposure, receiving location data associated with each respective blast sensor of the plurality of blast sensors, triangulating the blast exposure data from two or more of the plurality of blast sensors and the location data to locate a source of the blast exposure, identifying a blast signature of the blast exposure based on the blast exposure data, comparing the identified blast signature with one or more predefined blast signature profiles, identifying the source of the blast exposure based on the comparison of the identified blast signature, and notifying one or more operators of the blast exposure.

In some aspects, the techniques described herein relate to a computer-readable media, the method further including estimating a yield of the blast exposure from the blast exposure data, wherein the blast signature is identified based further on the estimated yield.

In some aspects, the techniques described herein relate to a computer-readable media, the method further including storing the blast exposure data within a data store, and providing the blast exposure data within a blast exposure report to monitor a health of the one or more operators.

In some aspects, the techniques described herein relate to a computer-readable media, the method further including causing display of an area of operation map within a user interface on a user device, the area of operation map including one or more ally position indicators, a current position indicator, and an enemy position indicator, wherein the enemy position indicator is displayed based at least in part on the identified blast source.

In some aspects, the techniques described herein relate to a computer-readable media, wherein the area of operation map further includes an enemy weapon identifier selected based on the identified blast source.

In some aspects, the techniques described herein relate to a computer-readable media, further including notifying one or more remote operators in a remote location of the blast exposure.

In some aspects, the techniques described herein relate to a method for identifying and triangulating blast exposure data, the method including receiving, from each of a plurality of blast sensors, blast exposure data corresponding to a blast exposure, receiving location data associated with the plurality of blast sensors, triangulating the blast exposure using the blast exposure data and the location data to locate a source of the blast exposure, estimating a yield of the blast exposure from the blast exposure data, identifying a blast signature of the blast exposure based on the estimated yield from the blast exposure data, comparing the identified blast signature with one or more predefined blast signature profiles, identifying the source of the blast exposure based on the comparison of the identified blast signature, and notifying one or more operators of the blast exposure.

In some aspects, the techniques described herein relate to a method, further including determining a velocity of an incoming projectile associated with the blast exposure, and notifying one or more operators of a direction associated with a velocity of the projectile.

In some aspects, the techniques described herein relate to a method, further including selecting a blast source type indicator for display within a user interface based on the identified source of the blast exposure.

In some aspects, the techniques described herein relate to a method, wherein the location data is received from a GPS receiver associated with a mobile user device.

In some aspects, the techniques described herein relate to a method, further including receiving audio data from one or more microphones of a user device, wherein the blast signature is identified based further on the audio data.

In some aspects, the techniques described herein relate to a method, further including receiving one or more predefined blast exposure signatures, and registering one or more known blast sources associated with the one or more predefined blast exposure signatures.

In some aspects, the techniques described herein relate to a method, further including determining that the blast exposure is associated with a friendly blast source based on the blast signature of the blast exposure, and determining that a subsequent blast exposure is associated with an enemy blast source based on a blast signature of the subsequent blast exposure.

In some aspects, the techniques described herein relate to a system for identifying and triangulating blast exposure data, the system including one or more blast sensors, a user device communicatively coupled to the one or more blast sensors, the user device including one or more microphones, one or more location sensors, at least one processor, and at least one non-transitory memory storing computer executable instructions that when executed by the at least one processor, perform a method for identifying and triangulating blast exposure data, the method including receiving, from the one or more blast sensors, blast exposure data corresponding to a blast exposure, receiving audio data from the one or more microphones, receiving location data from the one or more location sensors, triangulating the blast exposure data from the one or more blast sensors and the location data to locate a source of the blast exposure based at least in part on additional blast exposure data and additional location data from another user device, identifying a blast signature of the blast exposure based on the blast exposure data from the one or more blast sensors and the audio data from the one or more microphones, comparing the identified blast signature with one or more predefined blast signature profiles, and identifying the source of the blast exposure based on the comparison of the identified blast signature.

In some aspects, the techniques described herein relate to a system, the method further including estimating a yield of the blast exposure from the blast exposure data, wherein the blast signature is identified based further on the estimated yield.

In some aspects, the techniques described herein relate to a system, wherein the user device further includes a display, and one or more speakers, and wherein the method further includes notifying one or more operators of the blast exposure via the display and the one or more speakers of the user device.

In some aspects, the techniques described herein relate to a system, the method further including causing display of a weapon identifier on the display of the user device, wherein the weapon identifier is selected based on the identified source of the blast exposure.

In some aspects, the techniques described herein relate to a system, the method further including causing display of one or more ally position indicators based on respective locations of one or more ally users.

In some aspects, the techniques described herein relate to a system, wherein the one or more blast sensors includes at least one body-mounted blast sensor secured to an operator.

In some aspects, the techniques described herein relate to a system, the method further including storing blast exposure data from the at least one body-mounted blast sensor, and monitoring a health of the operator based on blast exposure data from the at least one body-mounted blast sensor.

In some aspects, the techniques described herein relate to one or more non-transitory computer-readable media storing computer-executable instructions that, when executed by at least one processor, perform a method for identifying and triangulating blast exposure data, the method including receiving, from each of a plurality of blast sensors, blast exposure data corresponding to a blast exposure, receiving location data associated with each respective blast sensor of the plurality of blast sensors, triangulating the blast exposure data from two or more of the plurality of blast sensors and the location data to locate a source of the blast exposure, identifying a blast signature of the blast exposure based on the blast exposure data, comparing the identified blast signature with one or more predefined blast signature profiles, identifying the source of the blast exposure based on the comparison of the identified blast signature, and notifying one or more operators of the blast exposure.

In some aspects, the techniques described herein relate to a computer-readable media, the method further including estimating a yield of the blast exposure from the blast exposure data, wherein the blast signature is identified based further on the estimated yield.

In some aspects, the techniques described herein relate to a computer-readable media, the method further including storing the blast exposure data within a data store, and providing the blast exposure data within a blast exposure report to monitor a health of the one or more operators.

In some aspects, the techniques described herein relate to a computer-readable media, the method further including causing display of an area of operation map within a user interface on a user device, the area of operation map including one or more ally position indicators, a current position indicator, and an enemy position indicator, wherein the enemy position indicator is displayed based at least in part on the identified blast source.

In some aspects, the techniques described herein relate to a computer-readable media, wherein the area of operation map further includes an enemy weapon identifier selected based on the identified blast source.

In some aspects, the techniques described herein relate to a computer-readable media, further including notifying one or more remote operators in a remote location of the blast exposure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
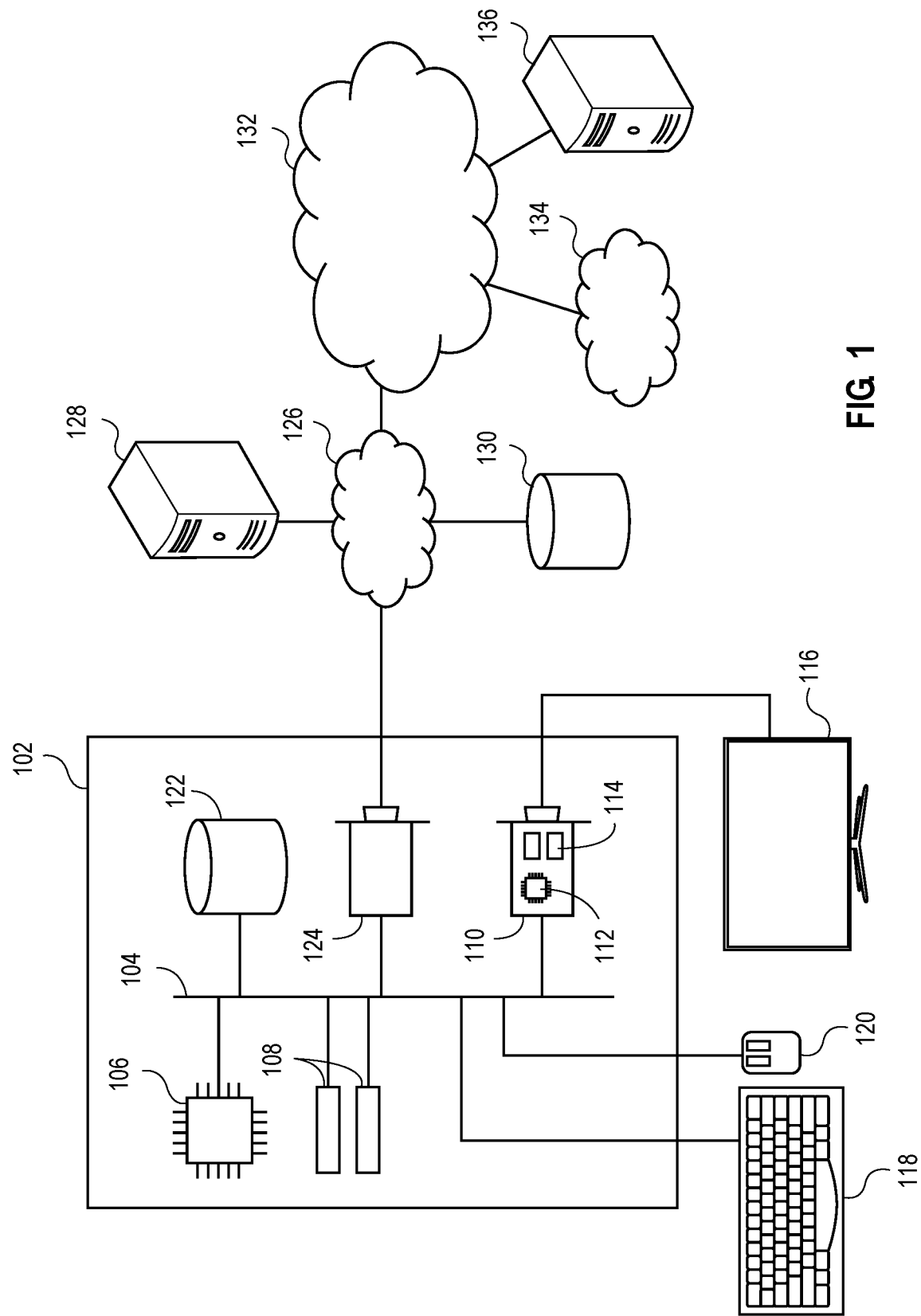
FIG. 1 depicts an exemplary hardware platform relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and may be non-transitory computer-readable media storing data or computer-executable instructions. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
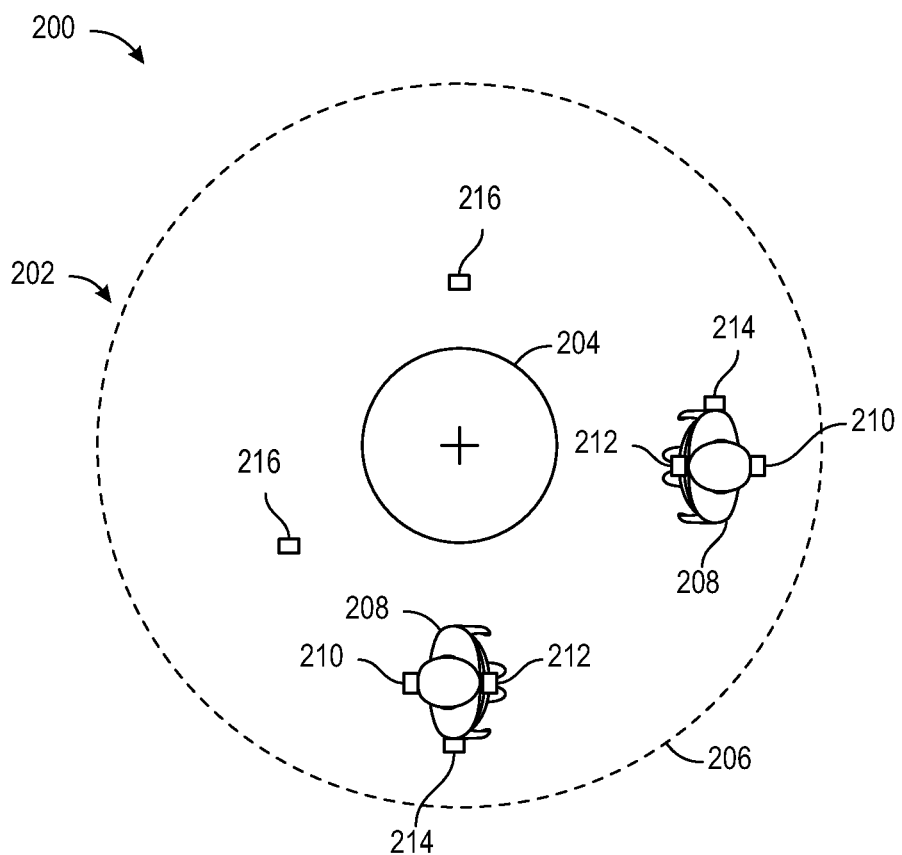
FIG. 2 depicts an exemplary blast exposure diagram relating to some embodiments of the invention.

Turning now to FIG. 2, a blast exposure diagram of an exemplary blast environment 200 is depicted, relating to some embodiments of the invention. In the depicted scenario, the blast environment 200 includes a blast 202 including a blast epicenter 204 and a blast wave 206 extending radially outward from the blast epicenter 204. However, it should be understood that, in some cases, the blast wave 206 may not be symmetrical, as shown, and is asymmetrical. For example, a muzzle blast from a gun, mortar, or artillery will not be radially uniform. In some embodiments, the blast epicenter 204 may be produced from any pressure-wave-generation source such as, for example, firing of a weapon or detonation of an explosive material. Broadly speaking, any detonation or deflagration event may be evaluated by embodiments of the invention. As shown, the blast wave 206 covers a greater radius than the blast epicenter 204 itself. In some embodiments, one or more operators 208 may be in proximity to the blast 202, as shown. In some embodiments, each of the operators 208 may be a user or operator of a source of blast 202 or may simply be present when blast 202 occurs or is triggered. For example, in some embodiments, the operators 208 are military personnel or law enforcement officers present when blast 202 occurs.

In some embodiments, each of the operators 208 has body-mounted sensors such including some or all of a head-mounted sensor 210 disposed on a back-side of a helmet of the operator 208, a chest-mounted sensor 212 disposed on a chest of the operator 208, and a shoulder-mounted sensor 214 disposed on a dominant shoulder of the operator 208. Alternatively, in some embodiments, the shoulder-mounted sensor 214 may be disposed on the right shoulder of the operator regardless of which shoulder is dominant. In some embodiments, each operator 208 may have three sensors. However, embodiments are contemplated in which any number of sensors may be included. For example, four sensors may be included with a sensor disposed on each shoulder.

In some embodiments, each of the head-mounted sensor 210, the chest-mounted sensor 212, and the shoulder-mounted sensor 214 may be a pressure sensor configured to measure and record a blast pressure over time. For example, in some embodiments, each sensor comprises a pressure sensing transducer such as, for example, a piezoelectric/resistive pressure sensor, a variable capacitance pressure sensor, a strain-gauge, or a solid-state pressure switch. However, embodiments are contemplated in which other types of suitable pressure sensing transducer not explicitly described herein are included.

In some embodiments, one or more static sensors 216 may be included within the blast environment 200, as shown. In some embodiments, each of the static sensors 216 may comprise a stake structure which is configured to be staked into the ground. Alternatively, in some embodiments, the static sensors 216 may be mounted to other suitable static structures such as walls or other static objects in the blast environment 200. In some embodiments, the static sensors 216 comprise a similar pressure sensing transducer as described above with respect to the body mounted sensors 210, 212, and 214.

In some embodiments, each of the body mounted sensors 210, 212, and 214, as well as the one or more static sensors 216, may be triggered to record data whenever a pressure is measured which exceeds a predefined trigger level. For example, in some embodiments, each of the blast sensors may be triggered to record data when the respective blast sensor measures a pressure greater than about 0.5 pounds per square inch (psi). However, embodiments are contemplated in which the predefined trigger level may be set to other pressure values such as 0.25 psi, 1.0 psi, or 1.5 psi. Further, in some embodiments, the predefined trigger level may be set and changed by an operator. In some embodiments, each of the blast sensors may record continuously (for example into a circular buffer) and begin persisting new data as well as the data from the circular buffer to longer-term storage when a blast is detected, so as to capture pressure data prior to the blast event.

As described above, the blast 202 may be caused by any of a variety of blast sources. For example, in some embodiments, the blast 202 comprises firing of an artillery weapon during either an active-duty operation or a training operation. Alternatively, the blast 202 may be associated with use of a firearm such as firing of a .50 caliber weapon or with the detonation of an explosive charge or breaching device. As another alternative, the blast 202 may be associated with a smaller weapon, such as a handgun or rifle. Each such blast source may produce a blast wave of varying size and magnitude with a unique blast signature.

Data from the blast wave 206 may be captured by all or a portion of the sensors described above for each operator 208. For example, data for the blast wave 206 may be recorded by the chest-mounted sensor 212 and the shoulder-mounted sensor 214 but not by the head-mounted sensor 210. However, readings from multiple measurement sources must be temporally correlated prior to analysis. Accordingly, in some embodiments, various techniques may be used to synchronize and correlate the data between the sensors. In some embodiments, each sensor may include an internal clock or timer such that each recorded pressure value may be associated with a time value or time stamp. However, clock drift and/or skew between the internal clock associated with the different sensors may cause inaccuracy within the time values. Accordingly, time shifts may be applied to correct said clock drift, as will be described in further detail below.

Figure 3:
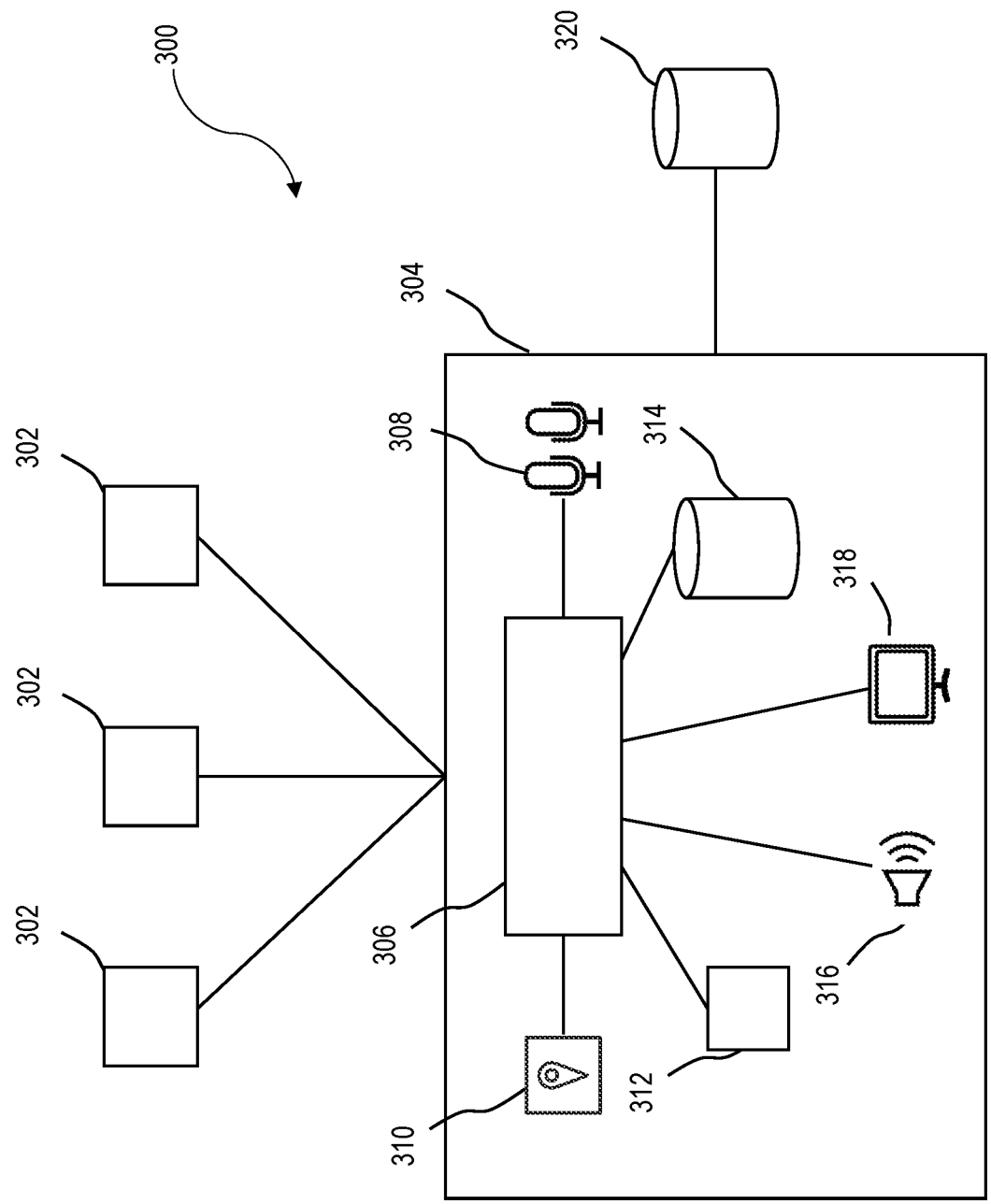
FIG. 3 depicts an exemplary system diagram of a system for processing blast exposure data relating to some embodiments of the invention.

Turning now to FIG. 3, an exemplary block diagram 300 is depicted relating to some embodiments of the invention. In some embodiments, one or more blast sensors 302 may be included, as shown. In some such embodiments, the blast sensors 302 may include the pressure sensors described above such as the head-mounted sensor 210, the chest-mounted sensor 212, and the shoulder-mounted sensor 214, as well as the static sensors 216. The blast sensors 302 may interface with a user device 304. For example, in some embodiments, the blast sensors 302 may be communicatively coupled with the user device 304, for example, via a Bluetooth® connection, another suitable wireless connection, or a wired connection. Accordingly, in some embodiments, the blast sensors 302 are configured to provide blast exposure data relating to one or more blast events to the user device 304. In some embodiments, the blast exposure data from the blast sensors 302 may be used to identify a blast source associated with a blast event. In some embodiments, the user device 304 may be a mobile user device, such as, for example, a mobile phone, a tablet, or a laptop computer. In some embodiments, the user device may be a head-mounted display such as an augmented reality display for heads-up tactical situational awareness. Additionally, embodiments are contemplated in which the user device 304 may be a static user device, such as a desktop computer or any other suitable computing device.

In some embodiments, the user device 304 comprises a processor 306 and one or more microphones 308. In some embodiments, the processor 306 is configured to process data received from the one or more blast sensors 302. Further, in some embodiments, the processor 306 processes audio data received from the one or more microphones 308. In some embodiments, the user device 304 further comprises a Global Positioning System (GPS) receiver 310 and an accelerometer 312. In some such embodiments, either or both of the GPS receiver 310 and the accelerometer 312 may be used to determine a location of the user device 304. For example, in some embodiments, GPS data from the GPS receiver 310 may be augmented with acceleration data from the accelerometer 312 to determine a more accurate location estimation. Alternatively, in some embodiments, the GPS data or acceleration data may be used alone to determine a location or a change in location. In some embodiments, the accelerometer may comprise either or both of an axial accelerometer and a rotational accelerometer. For example, in some embodiments, a rotational accelerometer may be used to estimate the rotational orientation or pose of an operator. GPS receiver 310 can also be used to calculate an accurate time in a shared reference frame, as a fourth component of an (x, y, z, t) tuple based on receiving GPS data from four or more GPS satellites. As described below, having a shared clock among various user devices such as user device 304 is useful for triangulating blast sources.

In some embodiments, an internal storage 314 may be included within the user device 304, as shown, for storing data associated with the user device 304. In some embodiments, the internal storage 314 stores data from the one or more blast sensors 302, as well as audio data from the one or more microphones 308, GPS data from the GPS receiver 310, and acceleration data from the accelerometer 312. In some embodiments, the internal storage 314 of the user device 304 further stores instructions for performing various operations. For example, the internal storage 314 may store a set of computer-readable instructions for performing an analysis on the received blast exposure data from the one or more blast sensors 302.

One distinct advantage of using the blast exposure data from the one or more blast sensors 302 to identify a blast source is that the blast sensors do not detect background noise such as when using an array of microphones. Accordingly, embodiments are contemplated in which the blast sensors 302 are able to trigger recording by the one or more microphones 308. For example, in some embodiments, a trigger signal may be transmitted to the user device 304 in response to a blast event sensed by the blast sensors 302. In some embodiments, the user device 304 automatically activates the one or more microphones in response to the transmitted signal. Alternatively, in some embodiments, audio data from the one or more microphones 308 may be stored within a circular storage buffer such that the audio data leading up to a blast event is also captured. In some embodiments, the circular storage buffer may be included within the internal storage 314 or alternatively, within a native storage of the one or more microphones 308.

In some embodiments, the user device 304 further comprises one or more speakers 316 and a display 318. In some embodiments, the speakers 316 and display 318 may be used, for example, to display a notification to a user based on a data analysis by the processor 306. In one example, the processor 306 may detect a threat using the blast exposure data along with any other data available to the user device 304 and notify a user of the threat via the speakers 316 and/or the display 318. In some embodiments, the speakers 316 and display 318 may be external from the user device 304. For example, the user device 304 may interface with a set of speakers in a headset to provide an operator with audible directional cues (for example "LEFT," "RIGHT," "UP," or "BEHIND") or other audible cues.

In some embodiments, an external data store 320 may interface with the user device 304, as shown. In some such embodiments, the external data store 320 may comprise a blast exposure data store including historic blast exposure data from previously recorded blast exposure events. Accordingly, the historic blast exposure data may be used to identify the source of a current blast exposure event by comparing blast exposure data from the one or more blast sensors 302 with data from previously recorded blast exposure events with a known source. For example, a weapon type associated with the blast exposure may be identified. In some embodiments, an indication of the blast source may be included within a notification to the user.

In some embodiments, a plurality of user devices 304 may be included. For example, in some embodiments, each of the operators 208 may have an associated user device. Further, in some embodiments, the one or more blast sensors 302 may comprise the head-mounted sensor 210, the chest-mounted sensor 212, and the shoulder-mounted sensor 214 for a single user. Accordingly, embodiments are contemplated in which each operator is equipped with the respective one or more blast sensors 302 such as the body-mounted sensors described above, as well as the user device 304 such as a mobile phone of the respective operator. Further, embodiments are contemplated in which communication is established between two or more user devices, for example, via a wired or wireless connection. In some embodiments, user devices may communicate over a network connection, BLUETOOTH connection, mesh network, or the like.

It should be understood that, in some embodiments, any of the components described with respect to the user device 304 may alternatively, or additionally be included externally. For example, the user device 304 may receive audio data from one or more external microphones. Further still, in some embodiments, at least a portion of the information processed by the processor 306 may be processed remotely by one or more external processors.

Figure 4A:
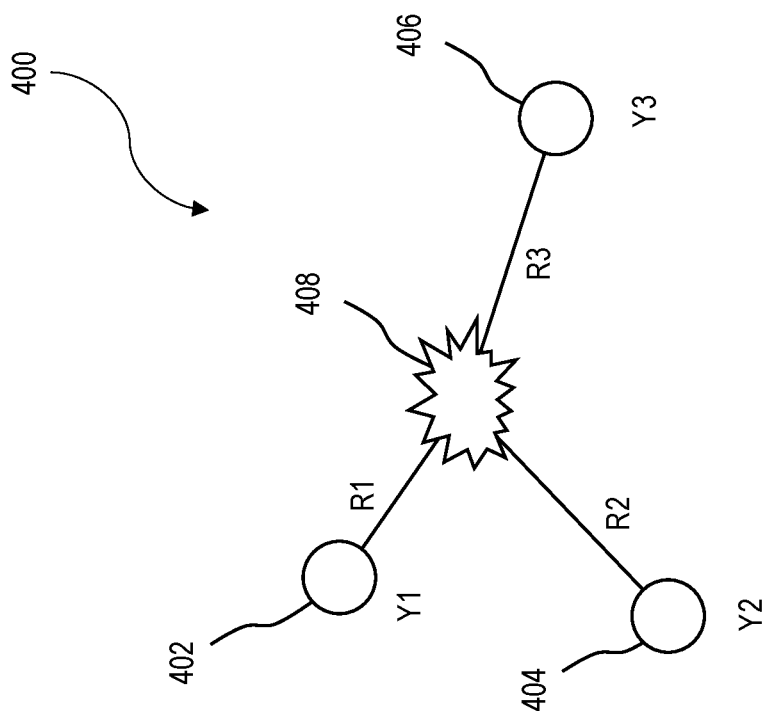
FIG. 4A depicts an exemplary diagram illustrating a range and yield estimation relating to some embodiments of the invention.

Turning now to FIG. 4A, an exemplary diagram 400 illustrating a range and yield estimation relating to some embodiments of the invention. In some embodiments, a first user device 402 in a first position, second user device 404 in a second position, and a third user device 406 in a third position may be included, as shown. In some embodiments, the positions of the respective user devices may be determined using location sensors such as the GPS receiver 310, the accelerometer 312, or a combination of the two. In some embodiments, each of the user devices 402, 404, and 406 may be associated with a respective user. Alternatively, in some embodiments, at least one user device may be static or mounted on an inanimate object, a drone, or a vehicle.

In some embodiments, a blast source 408 may be present, as shown, with an unknown position. Accordingly, each of the user devices 402, 404, and 406 may receive blast exposure data associated with the blast source 408 from respective blast sensors coupled to each user device. In some embodiments, an estimated yield, Y, and estimated range, R may be calculated for each user device based on the received blast exposure data. Here, the yield may represent the explosive mass or energy released by the blast source 408 and the range may represent an estimated distance to the blast source 408.

In some embodiments, the type of blast source may be identified based at least in part on the estimated yield. For example, a large yield may be associated with a large explosion from a large bomb or missile, while a medium yield may be associated with a smaller bomb or missile, a low yield may be associated with a grenade or Rocket-Propelled Grenade (RPG), and a very low yield may be associated with gunfire. Additionally, embodiments are contemplated in which a specific weapon type may be identified based on a blast exposure signature of the blast exposure data, as will be described in further detail below.

Figure 4B:
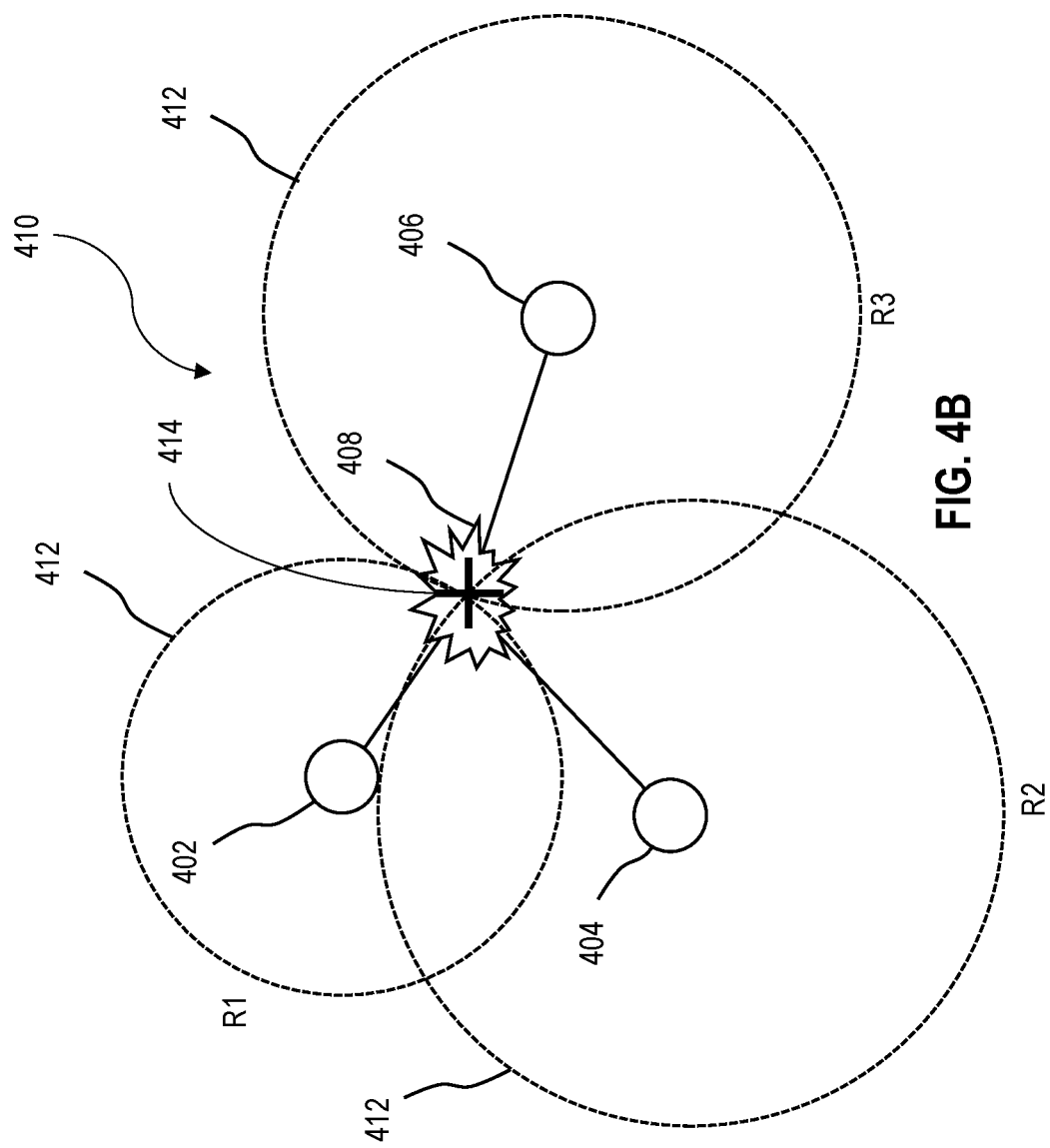
FIG. 4B depicts an exemplary diagram illustrating a blast triangulation relating to some embodiments of the invention.

Turning now to FIG. 4B, an exemplary diagram 410 illustrating a blast triangulation is depicted relating to some embodiments of the invention. In some embodiments, the estimated ranges from each of user device 402, user device 404, and user device 406 may be used to generate a respective estimated range sphere 412, as shown. It should be understood that the range spheres 412 are shown as two-dimensional circles but, in some embodiments, may comprise three-dimensional spheres such that a blast may be characterized within a three-dimensional space. In some embodiments, the estimated range, R, may be used as the radius to generate each respective range sphere 412. In some embodiments, the blast source 408 may be triangulated by determining an intersection of the estimated range spheres 412. In other embodiments, the blast source 408 may be triangulated based on the timing of the arrival of the blast wave at each of user device 402, user device 404, and user device 406 (as coordinated by the shared clock provided by the respective GPS receivers or otherwise). For example, an initial range sphere of radius zero can be established at the user device with the earliest time of arrival, and initial range spheres for the other user devices can be established with radius equal to the delay in the arrival of the blast wave at that user device after the earliest arrival multiplied by the speed of the blast wave. These spheres can then be expanded until their intersection converges to a single point, which can be determined to be the location of the blast sphere.

Accordingly, a position 414 may be pinpointed as an estimated center of the blast at the intersection of the range spheres 412. In some embodiments, a fourth range sphere may be estimated for yet another user device such that a height of the blast source may be determined where it might otherwise be ambiguous. Further, in some embodiments, additional range spheres may be estimated for any number of user devices to reduce the error of the position estimation. For example, in some embodiments, a position of the blast source may be estimated for a plurality of sets of user devices such as user device 304 and the average position may be calculated to achieve a higher degree of accuracy.

It should be understood that other techniques may be used to locate the blast source 408. For example, in some embodiments, only a single operator may be near the blast. Accordingly, if the operator has each of the head-mounted sensor 210, the chest-mounted sensor 212, and the shoulder-mounted sensor 214, data from each of these body-mounted sensors may be used to estimate the location of the blast source 408. For example, a range may be estimated from each of the body-mounted sensors and a direction of the operator may be retrieved from accelerometer data such that the orientation of the operator and position of each of the body-mounted sensors may be estimated. The estimated orientation and ranges may be used to triangulate the blast source 408 similar to as described above.

One challenge faced while analyzing the blast exposure data may be attributed to the potential for reflections of the blast wave. For example, a blast wave may bounce off of surfaces within the area of operation, which may produce unwanted and spurious data effects. Accordingly, in some embodiments, a filter may be applied for removing the effects of these reflections from the blast exposure data during the analysis. In some embodiments, the effects of reflections may be automatically factored out by considering blast exposure data from a plurality of blast sensors.

Additionally, embodiments are contemplated in which filters may be applied for removing false positive information from the blast exposure data. For example, in some embodiments, a blast exposure event may be triggered incorrectly such that the blast exposure data is not representative of an actual blast exposure. Accordingly, in such embodiments, said blast exposure data may be automatically disregarded, for example, to save processing resources. Suitable techniques for removing false positive data are described in earlier-filed U.S. patent application Ser. No. 17/093,107 filed Nov. 9, 2020, and entitled IDENTIFYING FALSE POSITIVE DATA WITHIN A SET OF BLAST EXPOSURE DATA, which is hereby incorporated by reference in its entirety.

Figure 5:
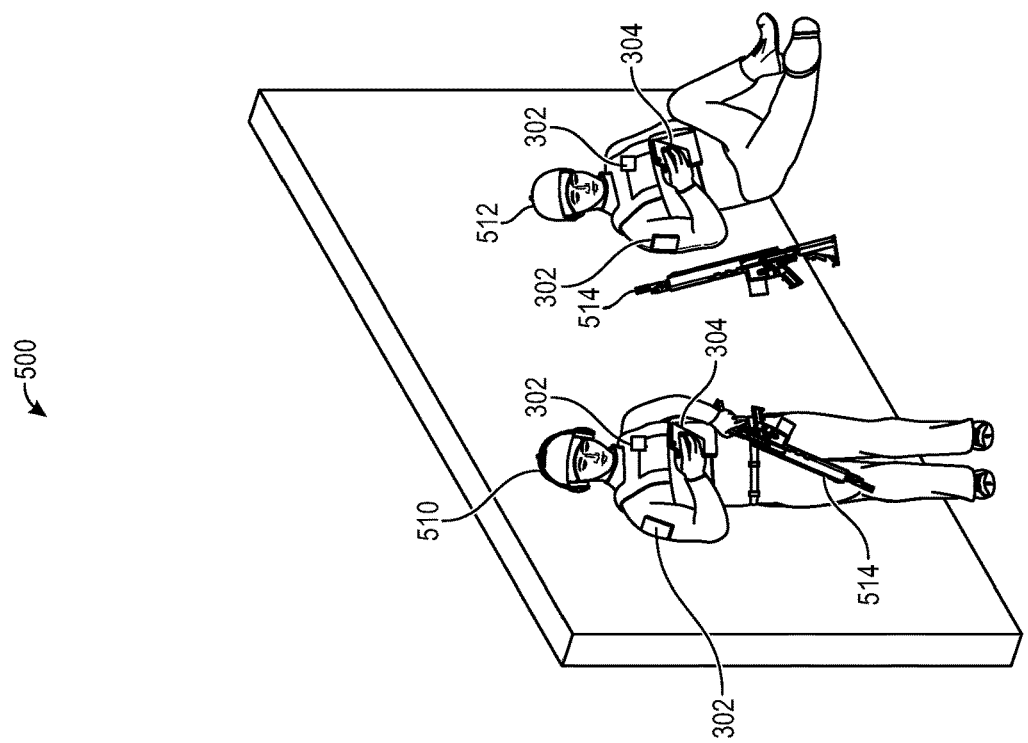
FIG. 5 depicts an exemplary operational environment relating to some embodiments of the invention.
Figure 5:
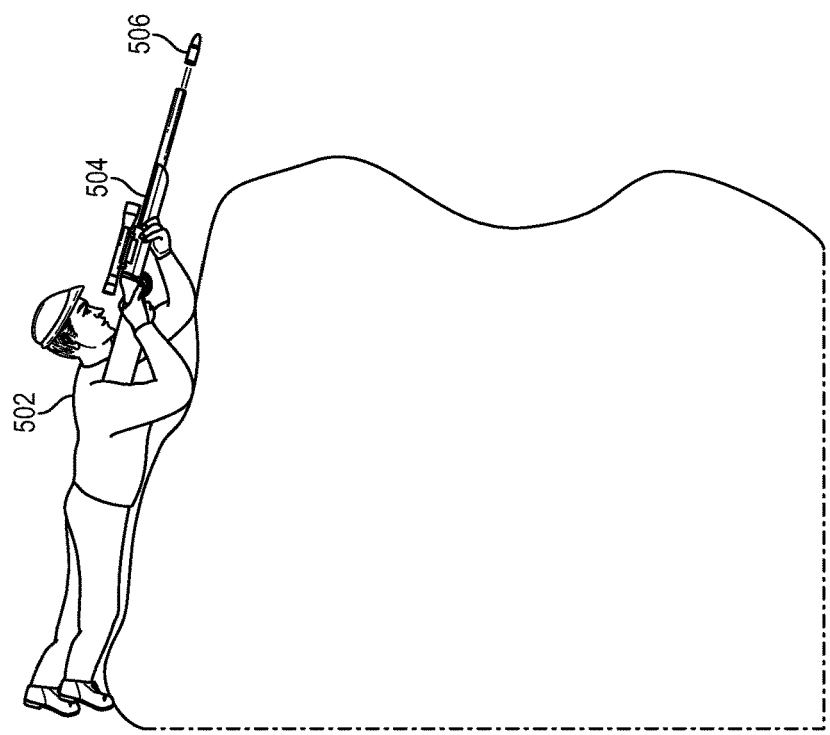

Turning now to FIG. 5, an exemplary operational environment 500 is depicted relating to some embodiments of the invention. In one exemplary situation, an enemy 502 equipped with a weapon 504 may be positioned within a hidden location, as shown. Accordingly, if the enemy 502 fires the weapon 504 a blast wave may be generated positioned at the hidden location. In some embodiments, for example, if the weapon 504 is a firearm, a projectile 506 may be ejected from the weapon 504, as shown.

Continuing the exemplary situation described above, a first operator 510 and a second operator 512 may be positioned within the operational environment 500 within the vicinity of the hidden location. In some embodiments, the operators 510 and 512 may be soldiers or other military personnel. Each of the operators 510 and 512 may be equipped with one or more blast sensors 302, which may be body-mounted sensors, as shown, and a user device 304. Further, each of the operators 510 and 512 may be equipped with a weapon 514. Accordingly, the blast sensors 302 may sense the blast emitted from the enemy weapon 504. In some embodiments, the user devices 304 may analyze the blast exposure data from the blast sensors 302 in order to triangulate the blast source, as described above with respect to FIGS. 4A and 4B. In some embodiments, the blast exposure data may be further augmented with audio data from the one or more microphones 308 of the user devices 304 to increase the accuracy of the triangulation.

In some embodiments, the user devices 304 may be configured to notify the operators 510 and 512 of the blast source. Further still, embodiments are contemplated in which the user devices 304 determine the type of blast source. For example, the user device 304 may determine the type of blast source based on the estimated yield from the blast exposure data. Accordingly, the weapon type of the enemy weapon 504 may be identified and the user device 304 may notify the operators 510 and 512 of what type of weapon has been fired. In some embodiments, the weapons 514 of the operators 510 and 512 may be registered as friendly weapons. Accordingly, the user device 304 may distinguish between the weapons 514 and the enemy weapon 504. Further, the type of weapon identified may be used to determine an affiliation of the enemy 502. For example, a database of known enemy and friendly weapon types may be persisted and updated to identify what specific weapon types are used by enemies and friendly operators. Here, the user devices 304 may access and retrieve weapon identification information from the database, for example, over a wireless internet connection. Further still, embodiments are contemplated in which weapon identification information may be stored within the internal storage 314 of each user device 304. In some embodiments, the weapon type may be identified based on a blast signature profile from the blast exposure data. For example, data may be persisted for a plurality of weapon types corresponding to known blast signature profiles such that the blast exposure profile of a sensed blast exposure may be used to identify the weapon type by comparing with the known blast signature profiles.

In some embodiments, a blast source may be classified as either a friendly source or an enemy source. In some embodiments, this identification may rely on registering certain weapon types as either friendly or hostile, as described above. Alternatively, or additionally, in some embodiments, a blast source may be classified as friendly based at least in part on the determined location of the blast source relative to at least one user device 304. For example, in some embodiments, a blast source may be classified as friendly if the blast source is within a predetermined proximity to a friendly user device 304. Further, in some embodiments, an analysis of specific blast parameters may also be considered. For example, the analysis may identify the direction of the blast exposure to determine whether the blast was generated by an operator associated with the respective user device. As such, embodiments are contemplated in which the blast exposure analysis differentiates between a user firing a weapon versus a user being fired upon from a close range. Further still, in some embodiments, explosions such as detonation of mines and other explosive equipment within the vicinity of an operator may automatically be classified as hostile. Additionally, embodiments are contemplated in which users may manually register certain equipment as friendly using a user interface. For example, a friendly operator may set up an explosive breaching device and register the device as friendly within a combat information application such that the device will be visible to other friendly users.

In some embodiments, additional information may be deduced from the blast exposure. For example, the velocity of the projectile 506 may be estimated including the direction of travel for the projectile 506. In some embodiments, the velocity may be estimated using any combination of the blast exposure data from the blast sensors 302 and the audio data from the microphones 308. Further, in some embodiments, time of arrival data from the blast exposure data may also be used to estimate the velocity of the traveling projectile. In some embodiments, operators 510 and 512 may be notified of the velocity of the projectile 506 via the display 318 and/or speakers 316 of the user device 304. In some embodiments, each operator may be notified based on the orientation of the respective operator. For example, the notification may include an indication that the projectile 506 is incoming from the 6 o'clock direction. Alternatively, or additionally, in some embodiments, a visual indication of the projectile 506 and its velocity (including the direction of travel) may be included on the display 318.

Further, embodiments are contemplated in which enemy parameters may be monitored. For example, in some embodiments, the number of specific types of blast exposures may be counted such that the number of rounds an enemy 502 has fired may be monitored. Accordingly, it may be possible to monitor the magazine capacity of the enemy weapon 504 based further on the identified weapon type. For example, if a particular type of weapon is known to have a standard magazine capacity of 30 rounds a notification may be submitted in response to determining that the enemy magazine capacity may be low.

It should be understood that though the exemplary situation above is described with respect to military personnel, additional embodiments are contemplated in which the invention may be applied to other operational environments. For example, in some embodiments, the invention may be utilized by law enforcement officers or other public safety personnel. Further, in some embodiments, the invention may be utilized by security personnel, for example, to identify and locate an active shooter.

Figure 6:
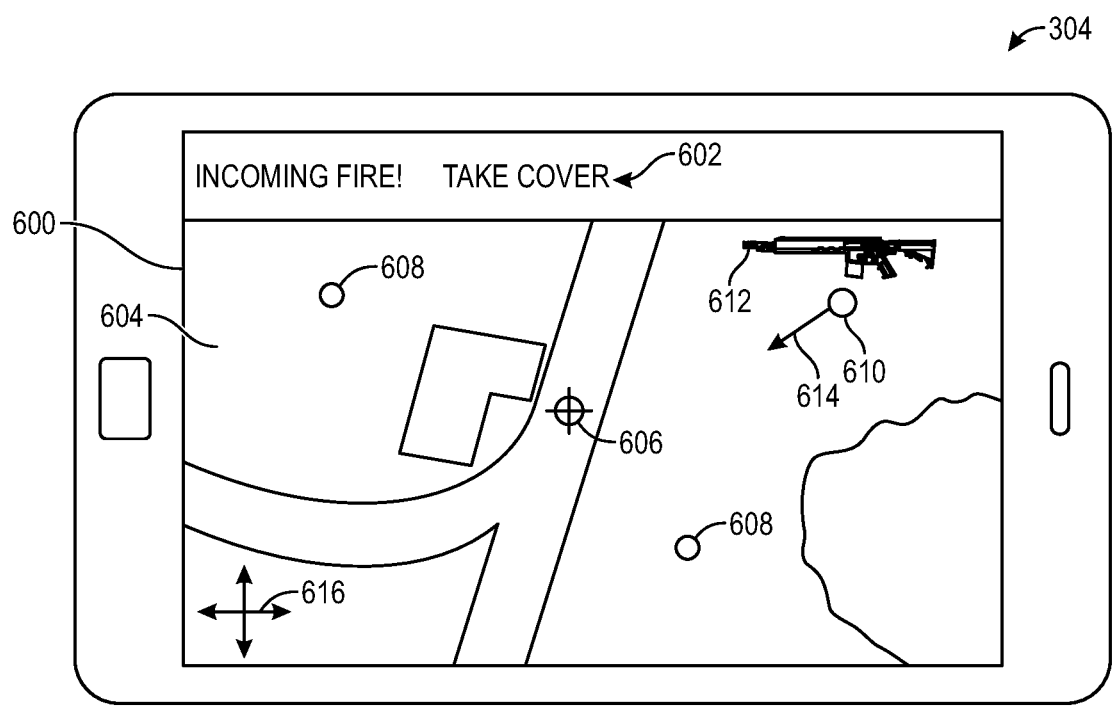
FIG. 6 depicts an exemplary user interface relating to some embodiments of the invention.

Turning now to FIG. 6, an exemplary user interface 600 is depicted relating to some embodiments of the invention. In some embodiments, the user interface 600 may be generated for display on the display 318 of the user device 304. In some embodiments, a notification message 602 may be included on the user interface 600, as shown. In some embodiments, the notification message 602 may include an indication of an identified blast exposure or other identified threat. In some embodiments, the notification message 602 further includes an indication of an estimated direction for an incoming projectile. Further, in some embodiments, the notification message 602 notifies the operator to take cover or may include additional information such as the enemy weapon type.

In some embodiments, a map 604 may be displayed on the user interface 600, as shown. In some such embodiments, the map 604 is a map of an area of operation of the respective user. Such an area of operation may be determined based on location data, for example, from the GPS receiver 310 of the user device 304. In some embodiments, the map 604 may be populated with terrain information retrieved from a location database. For example, in some embodiments, the map 604 may include a visual representation of one or more geographic features retrieved from Google Maps or a similar GIS location information service.

In some embodiments, a current position indicator 606 may be included, as shown, indicating a location of the user device 304 within the map 604. Further, in some embodiments, one or more ally position indicators 608, as shown, indicating the location of ally users within the map 604. In some embodiments, each operator may be equipped with a user device 304 capable of determining the operator's location. Accordingly, in some embodiments, a plurality of user devices 304 from a respective plurality of operators may communicate wirelessly to share ally location information.

In some embodiments, an enemy position indicator 610 may be included, as shown, indicating the location of an enemy within the map 604. In some embodiments, the enemy position may be determined based on analyzing blast exposure data from the one or more blast sensors 302 by any number of user devices 304. In some embodiments, an enemy weapon identifier 612 may be selected and displayed with the enemy position indicator 610. In some embodiments, the enemy weapon identifier 612 may be displayed in response to determining a weapon type or type of blast source from the blast exposure data, as described above. In some embodiments, a direction indicator 614 may be included showing the direction of incoming fire from an enemy blast source.

In some embodiments, a plurality of enemy position indicators 610 may be included on the user interface 600 including any combination of respective enemy weapon identifiers 612 and direction indicators 614 corresponding to each of enemy position indicators 610. Additionally, embodiments are contemplated in which the enemy weapon identifiers 612 and direction indicators 614 may not be included. In some embodiments, each of the one or more ally position indicators 608 and the enemy position indicator 610 may be color coded or symbol coded to distinguish between allied and enemy forces shown on the map 604. For example, in some embodiments, enemy position indicators 610 may be displayed with a red color while one or more ally position indicators 608 may be displayed with a blue color such that an operator can easily distinguish between friendly and hostile entities. Further still, embodiments are contemplated in which a specific affiliation of an entity may be estimated based at least in part on the blast exposure data. For example, if an enemy force is known to use a specific type of weapon an indication of affiliation with that enemy force may be included along with the enemy position indicator 610 in response to identifying that type of weapon as the blast source.

In some embodiments, a compass 616 may be included on the map 604, as shown, for indicating an orientation of the map 604. In some embodiments, the map 604 may be rotated automatically based on an orientation of the operator. Alternatively, or additionally, in some embodiments, rotation of the map 604 may be anchored. Further, in some embodiments, the rotation of the map 604 may be manually set by the operator.

In some embodiments, an existing application may be interfaced with and augmented with the identified blast exposure information. For example, embodiments are contemplated in which the Android Team Awareness Kit/Android Tactical Assault Kit (ATAK) or a similar application may be used to present the user interface 600 described herein. For example, the ATAK software may be integrated to present additional information based on the analyzed blast exposure data and blast source information. In some embodiments, as described above, the user device 304 may interface with a headset or earpiece such that audible cues may be transmitted to a user.

Figure 7A:
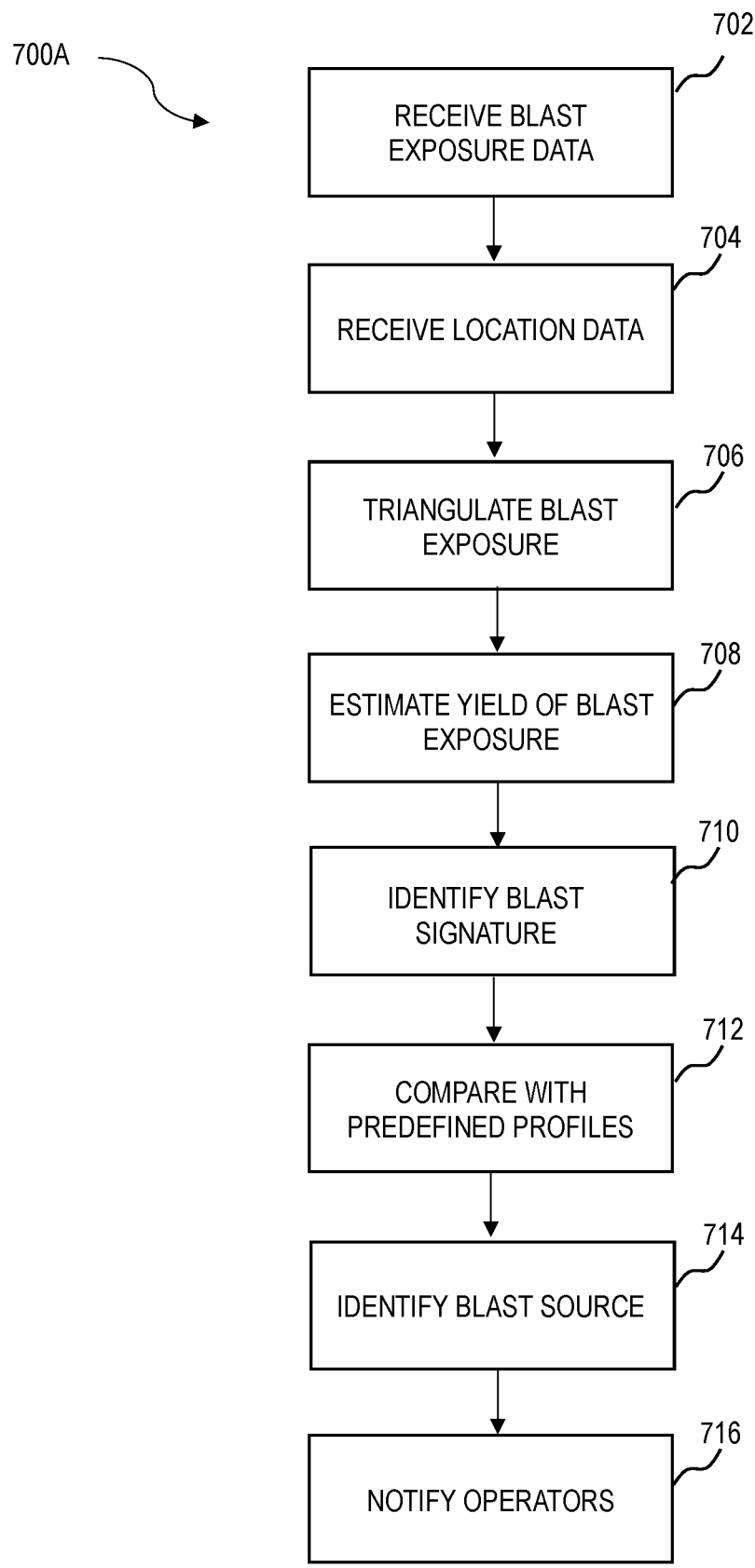
FIG. 7A depicts an exemplary method for identifying and triangulating blast exposure data relating to some embodiments of the invention.

Turning now to FIG. 7A, an exemplary method 700A for identifying and triangulating blast exposure data is depicted relating to some embodiments of the invention. In some embodiments, at least a portion of the steps described herein with respect to the method 700A may be performed by a processor. For example, in some embodiments, the processor 306 of the user device 304 may perform at least a portion of the steps of method 700A. Further, in some embodiments, processing may be divided between two or more entities. For example, in some embodiments, a first portion of steps may be carried out on a first user device while a second portion of steps is performed by a second user device, a remote server, or another entity.

At step 702, blast exposure data is received from the one or more blast sensors 302. In some embodiments, a set of blast exposure data is received for each of a plurality of operators where each operator may be equipped with one or more body mounted blast sensors. Further, embodiments are contemplated in which blast exposure data may be received from one or more static blast sensors or blast sensors mounted on a vehicle or inanimate object. For example, at least one blast sensor may be secured to a stake structure placed in the ground or another surface, as described above.

In some embodiments, audio data is also received along with the blast exposure data at step 702 or at a subsequent step. Additionally, in some embodiments, various techniques may be applied to synchronize the data received from many disparate sources. For example, clock drift may be present within each of the blast sensors 302, as well as in the microphones 308. Accordingly, various synchronization techniques may be applied to match data relating to a given blast exposure event. In some embodiments, a shared global clock (for example, a shared clock generated based on GPS signals) is used as a baseline. In other embodiments, grouping techniques may be utilized to group data relating to a similar blast exposure profile. In some embodiments, blast exposure data as well as (in some such embodiments) audio data may be grouped and time-shifted using a peak matching technique to identify similar peaks within the data. Further, in some embodiments, the location data may be accounted for such that location effects such as time of arrival are considered. For example, the time of arrival of a blast wave for a blast sensor that is closer to the blast source is expected to be earlier compared to a blast sensor positioned further from the blast source. Accordingly, a time shift of the data may additionally be based on the location data for each sensor or set of sensors.

In some embodiments, the audio data received from the one or more microphones 308 may be used to identify and locate a subsonic projectile (or a supersonic projectile with a trajectory such that the launch sounds arrive prior to the projectile itself or where the supersonic projectile misses its target) before it arrives. For example, the audio data may be used to identify a guided missile traveling at subsonic speed. In some embodiments, the direction of travel for the projectile may also be determined based on the audio data. Further, embodiments are contemplated in which the audio data may also be used for identifying projectiles. For example, supersonic projectiles may not be able to be identified before they arrive, but the identification will still be useful to inform operators of the location that the projectile originated from such that operators can be notified and can respond, for example, in advance to a subsequently fired projectile.

At step 704, location data associated with the blast sensors 302 is received. In some embodiments, the location data may be received from either or both of the GPS receiver 310 or the accelerometer 312. In some embodiments, a set of location data may be received for each of the plurality of operators identifying the respective operator's position within an area of operation. Embodiments are contemplated in which one or more blast sensors 302 may be associated with each operator such that the position of the blast sensors 302 may be determined based on the operator's position.

At step 706, the blast exposure is triangulated using the blast exposure data and the location data. In some embodiments, the blast may be triangulated similar to as described above with respect to FIGS. 4A and 4B. For example, an estimated range may be calculated for each of blast sensors 302 or for each user device 304 and based on the estimated ranges and locations of the user devices 304 the source of the blast exposure may be located.

At step 708, a yield of the blast exposure may be estimated based on the received blast exposure data. At step 710, a blast signature of the blast exposure is identified based on the blast exposure data. In some embodiments, the blast signature may be identified based on the estimated yield for the blast exposure. For example, a high yield may be associated with a large blast signature such as a large explosion while a lower yield may be associated with a smaller blast signature such as gunfire.

At step 712 the identified blast signature may be compared with one or more predefined blast signature profiles. For example, one or more predefined blast signature profiles may be retrieved from a data store such as the internal storage 314 of the user device 304 or the external data store 320. In some embodiments, the predefined blast signatures correspond to known types of blast sources. In some embodiments, a blast signature profile may be recorded for each of a variety of weapon types and other blast sources such as, for example, bombs, missiles, grenades, RPGs, flash and concussive grenade, explosive charges, and various types of gunfire. In some embodiments, a specific type of firearm or other weapon may be identified for each blast exposure profile.

At step 714, the source of the blast exposure is identified based on the comparison with the predefined blast signature profiles. In some embodiments, the source may be identified as a type of blast source or even a specific type of weapon or explosion may be identified. In some embodiments, a combination of the blast exposure data from the one or more blast sensors 302 and audio data from the one or more microphones 308 may be used to identify the blast source. In some embodiments, audio signatures relating to respective types of weapon sources may be stored and compared against to determine the type of blast source. In some embodiments, the blast exposure analysis may be augmented with the audio data to achieve a further degree of accuracy in identifying the blast source. For example, the blast source may first be identified based on the blast exposure data and then be checked against an identification using the audio data.

At step 716, one or more operators may be notified of the blast exposure by any combination of visual and audible cues, for example, using any suitable notification system such as the speakers 316 or display 318 of the user device 304. In some embodiments, a notification of the blast exposure may be presented to the one or more operators including additional information for the blast exposure described herein such as the type of blast source, a weapon identifier, a direction indicator, a location of the blast source, and a warning to the operator.

Embodiments are contemplated in which a response may be determined based at least in part on the identified blast source. For example, in some embodiments, a response may be included within the notification to the operators, where the response is selected from any of taking cover, retreating to a new location, providing cover fire, deploying a flare, smoke, or other signaling device, or many other suitable responsive actions. In some such embodiments, the response may be selected based, for example, on the estimated yield or weapon type of the blast exposure. Further still, in some embodiments, a response to the identified blast source may be at least partially automated. For example, allied forces may be automatically notified based on an identified blast source endangering one or more operators. Accordingly, embodiments are contemplated in which the user device 304 automatically signals for backup from one or more other operators or allied forces. For example, in some embodiments, allied air support may automatically be informed of an identified blast source.

It should be understood that any number of the steps described herein with respect to the method 700A may be repeated or skipped. For example, in some embodiments, various steps may be repeated to identify a subsequent blast exposure from a subsequent blast exposure event. Further, in some embodiments, two or more steps may be performed simultaneously or in a different order than as described herein.

Figure 7B:
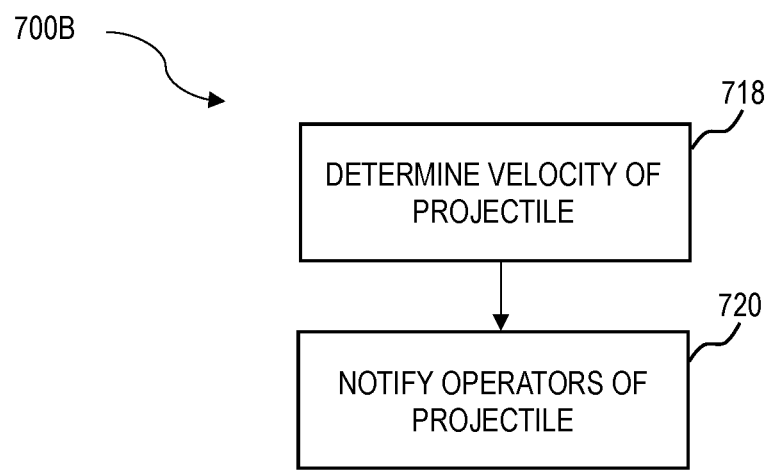
FIG. 7B depicts an exemplary continued method relating to some embodiments of the invention.

Turning now to FIG. 7B, an exemplary continued method 700B is depicted relating to some embodiments of the invention. In some embodiments, the method 700B may be performed after or simultaneously to at least a portion of the steps of the method 700A described above. At step 718, the velocity of a projectile is determined based at least in part on the blast exposure data. In some embodiments, the projectile is a bullet or missile associated with the blast exposure. In some embodiments, the velocity is determined based further in part on audio data collected from the one or more microphones 308. In some embodiments, the Doppler effect may be considered to determine the velocity and direction of the projectile.

At step 720, one or more operators are notified of the projectile. In some embodiments, a notification of the projectile may include the velocity or direction of travel of the projectile. Accordingly, the operators may be warned to take cover or perform other precautionary measures to prevent harm to the operators of an approaching projectile. In some embodiments, at least one operator may be notified of the incoming projectile using the user interface 600 described above. For example, a notification message 602 including an estimated direction of the projectile may be generated in response to determining the velocity of a projectile. Alternatively, or additionally, in some embodiments, the direction of the projectile may be indicated on the user interface 600 using the direction indicator 614, as shown in FIG. 6.

It should be understood that, in some embodiments, the steps of method 700A and 700B may be optional. For example, in some embodiments, only a portion of the steps are performed. Further, embodiments are contemplated in which none of the steps of method 700B are performed. For example, the velocity of the projectile may not be determined. Instead, in some embodiments, a direction of a blast source relative to the operator may be determined based on the blast exposure data and/or the audio data.

In some embodiments, one or more machine learning models may be incorporated into the analysis method described above. For example, in some embodiments, a machine learning model may be trained with historic blast exposure data such that the machine learning model can identify the direction of a projectile associated with a blast exposure. Accordingly, such a machine learning model may be able to determine the velocity of a projectile based on blast exposure data received from the one or more blast sensors 302. It should be understood that, in some embodiments, other types of machine learning models may be used for a variety of purposes. For example, a machine learning model may be used to identify a weapon type or a type of blast source. Further, a machine learning model is contemplated for determining a direction of travel of a projectile based on a blast signature. For example, such a machine learning model may be trained with historical blast exposure data corresponding to varying directions respective to the blast sensor such that the machine learning model is able to estimate the direction of a projectile associated with a blast exposure based on blast exposure data received from one or more sensors.

In some embodiments, the variables and parameters collected and calculated during the blast exposure analysis described above may be recycled and used for a health analysis. For example, in some embodiments, the blast exposure data may be stored and used to monitor the health of one or more operators. In some embodiments, one or more additional blast exposure metrics such as, incident peak overpressure, positive phase duration, and incident overpressure impulse. Suitable techniques for monitoring blast exposures are described in earlier-filed U.S. patent application Ser. No. 17/683,808 filed Mar. 1, 2022, and entitled BLAST EXPOSURE ASSESSMENT SYSTEM, which is hereby incorporated by reference in its entirety. In some embodiments, any of the analysis techniques described with respect to the earlier-filed application may be applied to the blast exposure data.

In some embodiments, a health analysis may be performed in real-time in response to a blast exposure event. For example, in some embodiments, the incident peak overpressure and/or incident overpressure impulse associated with a blast exposure may be calculated to determine if the operator is at risk of a blast-related injury such as a traumatic brain injury. Accordingly, in such embodiments, the operator may be notified if at least one blast exposure metric is above a predetermined safety threshold. Furthermore, in some embodiments, a blast exposure report may be generated to monitor the health of one or more operators exposed to blast data.

In some embodiments, additional objects may be identified using either of the blast exposure data or the audio data. For example, in some embodiments, drones, vehicles, and other objects may be identified using the audio data collected by the one or more microphones 308 of the user device 304. In some embodiments, a Doppler shift technique may be used to identify the velocity of a moving object based at least in part on the audio data. For example, in some embodiments, the one or more microphones 308 may sense the sound of an approaching drone. Here, the Doppler effect may be considered to estimate the speed and direction of the drone relative to the user device 304.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for identifying and triangulating blast exposure data, the method comprising:
   training a machine learning model based on a set of historical blast data corresponding to a plurality of types of blast sources;
   receiving, from each of a plurality of blast sensors, the blast exposure data corresponding to a blast exposure, the blast exposure data comprising pressure trace data over time;
   receiving location data associated with the plurality of blast sensors;
   triangulating the blast exposure using the blast exposure data and the location data to locate a source of the blast exposure;
   estimating a yield of the blast exposure from the blast exposure data;

identifying a blast signature of the blast exposure based on the yield from the blast exposure data;
performing a comparison of the blast signature with one or more predefined blast signature profiles;
identifying, using the machine learning model, the source of the blast exposure based on the comparison of the blast signature; and
notifying one or more operators of the blast exposure.

2. The method of claim 1, further comprising:
determining a velocity of a projectile associated with the blast exposure; and
notifying the one or more operators of a direction associated with the velocity of the projectile.

3. The method of claim 1, further comprising:
selecting a blast source type indicator for display within a user interface based on the source of the blast exposure.

4. The method of claim 1, wherein the location data is received from a GPS receiver associated with a mobile user device.

5. The method of claim 1, further comprising:
receiving audio data from one or more microphones of a user device,
wherein the blast signature is identified based further on the audio data.

6. The method of claim 1, further comprising:
receiving one or more predefined blast exposure signatures; and
registering one or more known blast sources associated with the one or more predefined blast exposure signatures.

7. The method of claim 1, further comprising:
determining that the blast exposure is associated with a friendly blast source based on the blast signature of the blast exposure; and
determining that a subsequent blast exposure is associated with an enemy blast source based on a subsequent blast signature of the subsequent blast exposure.

8. A system for identifying and triangulating blast exposure data, the system comprising:
one or more blast sensors; and
a user device communicatively coupled to the one or more blast sensors, the user device comprising:
one or more microphones;
one or more location sensors;
at least one processor; and
at least one non-transitory memory storing computer executable instructions that when executed by the at least one processor, perform a method for identifying and triangulating the blast exposure data, the method comprising:
receiving, from the one or more blast sensors, the blast exposure data corresponding to a blast exposure, the blast exposure data comprising pressure trace data over time;
receiving audio data from the one or more microphones;
receiving location data from the one or more location sensors;
applying a clock synchronization technique to remove clock drift from the blast exposure data and the audio data from the one or more microphones using a shared global clock as a baseline;
triangulating the blast exposure data from the one or more blast sensors and the location data to locate a source of the blast exposure based at least in part on additional blast exposure data and additional location data from a further user device;
identifying a blast signature of the blast exposure based on the blast exposure data from the one or more blast sensors and the audio data from the one or more microphones;
performing a comparison of the blast signature with one or more predefined blast signature profiles; and
identifying the source of the blast exposure based on the comparison of the blast signature.

9. The system of claim 8, the method further comprising:
estimating a yield of the blast exposure from the blast exposure data,
wherein the blast signature is identified based further on the yield.

10. The system of claim 8,
wherein the user device further comprises a display, and one or more speakers, and
wherein the method further comprises notifying one or more operators of the blast exposure via the display and the one or more speakers of the user device.

11. The system of claim 10, the method further comprising:
causing display of a weapon identifier on the display of the user device,
wherein the weapon identifier is selected based on the source of the blast exposure.

12. The system of claim 11, the method further comprising:
causing display of one or more ally position indicators based on respective locations of one or more ally users.

13. The system of claim 8, wherein the one or more blast sensors comprises at least one body-mounted blast sensor secured to an operator.

14. The system of claim 13, the method further comprising:
storing the blast exposure data from the at least one body-mounted blast sensor; and
monitoring a health of the operator based on the blast exposure data from the at least one body-mounted blast sensor.

15. One or more non-transitory computer-readable media storing computer-executable instructions that, when executed by at least one processor, perform a method for identifying and triangulating blast exposure data, the method comprising:
receiving, from each of a plurality of blast sensors, the blast exposure data corresponding to a blast exposure, the blast exposure data comprising pressure trace data over time;
receiving location data associated with each respective blast sensor of the plurality of blast sensors;
applying a clock synchronization technique to remove clock drift from the blast exposure data;
triangulating the blast exposure data from two or more of the plurality of blast sensors and the location data to locate a source of the blast exposure;
identifying a blast signature of the blast exposure based on the blast exposure data;
performing a comparison of the blast signature with one or more predefined blast signature profiles; and
identifying, using a machine learning model, the source of the blast exposure based on the comparison of the blast signature.

16. The computer-readable media of claim 15, the method further comprising:

estimating a yield of the blast exposure from the blast exposure data,
wherein the blast signature is identified based further on the yield.

17. The computer-readable media of claim 15, the method further comprising:
storing the blast exposure data within a data store; and
providing the blast exposure data within a blast exposure report to monitor a health of one or more operators.

18. The computer-readable media of claim 15, the method further comprising:
causing display of an area-of-operation map within a user interface on a user device, the area-of-operation map including one or more ally position indicators, a current position indicator, and an enemy position indicator,
wherein the enemy position indicator is displayed based at least in part on the blast signature.

19. The computer-readable media of claim 18, wherein the area-of-operation map further includes an enemy weapon identifier selected based on the blast signature.

20. The computer-readable media of claim 15, further comprising:
notifying one or more remote operators in a remote location of the blast exposure.

* * * * *